Patented Mar. 5, 1946

2,396,012

UNITED STATES PATENT OFFICE 2,396,012

INSECT REPELLENT COMPOSITIONS

Howard A. Jones and Bernard V. Travis, Orlando, Fla.; dedicated to the free use of the People in the Territory of the United States No Drawing. Application March 9, 1945, Serial No. 581,819

5 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to insect repellent compositions and has among its objects the provision of effective and long-lasting compositions for repelling insects, particularly mosquitoes.

It has been found that effective insect repellent compositions can be prepared by employing as their essential active ingredients certain organic acids, including undecylenic acid, 2-ethyl-n-caproic acid, n-capric acid, pelargonic acid, and cyclohexanecarboxylic acid.

These organic acids may be used in several ways to repel insects. They may be applied to the exposed part of the body or to clothing, either in their undiluted form or in suitable inert carriers, such as solvents like mineral oils, vegetable oils, various alcohols, etc. They may also be incorporated into inert powders to obtain a paste or cream for application to the skin and also may be applied in the form of aqueous emulsions, particularly in the treatment of clothing to prevent mosquito bites and chigger attachments. For example, when applied in this way to impregnate clothing, undecylenic acid and 2-ethyl-n-caproic acid have been found to be very effective in preventing attachment of Trombiculidae (chiggers). Furthermore, it has been found that the repellent effect lasts much longer when applied to clothing than when applied to the skin. In general, the insect repellent compositions may be applied to any area from which it is desired to repel the insects.

It has been found, furthermore, that in any of the different aforementioned modes of application, the repellent composition may comprise the aforementioned acids individually, varying combinations of the acids, or all the acids collectively. In addition, the acids may be mixed with other known insect repellents, such as dimethyl phthalate to accomplish the desired purpose.

The compositions of this invention have been tested by the standard method employed in evaluating insect repellent compositions. In this method, one-fourth teaspoonful of the insect repellent composition is applied to the forearm from wrist to elbow and the arm then exposed to a large number of hungry mosquitoes or other biting insects, the time elapsing to the first bite being recorded. This test is of a practical nature and gives results that are highly indicative of the value of an insect repellent in actual field use.

The following table illustrates the results obtained against the Aedes aegypti and Anopheles quadrimaculatus, as examples of the insects against which the insect repellent compositions are effective, using the above method and utilizing undecylenic acid, 2-ethyl-n-caproic acid, n-capric acid, pelargonic acid, and cyclohexanecarboxylic acid in their undiluted form and when diluted with inert carriers.

| Repellent composition | Average repellent time to first bite in minutes | |
|---|---|---|
| | Aedes aegypti | Anopheles quadrimaculatus |
| Undecylenic acid | 249 | 158 |
| 2-ethyl-n-caproic acid | 206 | 146 |
| n-Capric acid | 362 | 108 |
| Pelargonic acid | 153 | 60 |
| Cyclohexanecarboxylic acid | 120 | 39 |
| Undecylenic acid 50%, olive oil 50% | 242 | 87 |
| Undecylenic acid 50%, ethanol 50% | 40 | 58 |
| 2-ethyl-n-caproic acid 50%, olive oil 50% | 101 | 62 |
| 2-ethyl-n-caproic acid 50%, ethanol 50% | 69 | 74 |
| Cyclohexanecarboxylic acid 50%, olive oil 50% | 112 | |

Having thus described our invention, what is claimed is:

1. A method of repelling insects comprising applying to the area from which the insects are to be repelled an insect repellent composition containing 2-ethyl-n-caproic acid as its essential active ingredient.

2. A method of repelling insects comprising applying to the area from which the insects are to be repelled an insect repellent composition containing pelargonic acid as its essential active ingredient.

3. A method of repelling insects comprising applying to the area from which the insects are to be repelled an insect repellent composition containing cyclohexanecarboxylic acid as its essential active ingredient.

4. A method of repelling insects comprising applying to the area from which the insects are to be repelled an insect repellent composition containing as its essential active ingredient an organic acid selected from the group consisting of 2-ethyl-n-caproic acid, pelargonic acid, and cyclohexanecarboxylic acid.

5. An insect repellent composition comprising an aqueous emulsion of 2-ethyl-n-caproic acid.

HOWARD A. JONES.
BERNARD V. TRAVIS.